(12) United States Patent
Lönnqvist

(10) Patent No.: US 7,455,273 B2
(45) Date of Patent: Nov. 25, 2008

(54) PROJECTOR HOLDER

(75) Inventor: Hans Lönnqvist, Stockholm (SE)

(73) Assignee: EFAB - Erik Frisell AB, Enskede (SE)

( * ) Notice: Subject to any disclaimer, the term of this patent is extended or adjusted under 35 U.S.C. 154(b) by 397 days.

(21) Appl. No.: 10/550,394

(22) PCT Filed: Mar. 9, 2004

(86) PCT No.: PCT/SE2004/000340

§ 371 (c)(1),
(2), (4) Date: Sep. 22, 2005

(87) PCT Pub. No.: WO2004/085909

PCT Pub. Date: Oct. 7, 2004

(65) Prior Publication Data

US 2006/0186309 A1   Aug. 24, 2006

(30) Foreign Application Priority Data

Mar. 25, 2003  (SE) .................................. 0300817

(51) Int. Cl.
*B42F 13/00* (2006.01)
(52) U.S. Cl. .................... 248/343; 248/317; 248/324
(58) Field of Classification Search ............... 248/317, 248/323, 324, 342, 343, 346.06, 309.1, 316.8, 248/917
See application file for complete search history.

(56) References Cited

U.S. PATENT DOCUMENTS

| | | | |
|---|---|---|---|
| 1,572,610 A * | 2/1926 | Lacks et al. ............... 248/317 |
| 2,423,584 A * | 7/1947 | Currier .................... 248/309.1 |
| 2,464,286 A * | 3/1949 | Bates .......................... 223/39 |
| 3,372,895 A * | 3/1968 | Azmi ........................ 248/27.1 |
| 4,239,196 A * | 12/1980 | Hanger ....................... 269/17 |
| 5,181,686 A * | 1/1993 | Barthel .................. 248/346.07 |
| 5,507,118 A * | 4/1996 | Brown ........................... 49/61 |
| 5,551,658 A | 9/1996 | Dittmer |
| 5,660,361 A * | 8/1997 | Penger ....................... 248/131 |
| 5,938,161 A | 8/1999 | Takeuchi et al. |
| 6,988,698 B2 * | 1/2006 | O'Neill ....................... 248/323 |
| 7,190,586 B2 * | 3/2007 | Franz et al. ................. 361/704 |

(Continued)

FOREIGN PATENT DOCUMENTS

EP    0 332 762    9/1989

(Continued)

*Primary Examiner*—Gwendolyn Baxter
*Assistant Examiner*—Michael McDuffie
(74) *Attorney, Agent, or Firm*—Jacobson Holman PLLC

(57) ABSTRACT

A projector holder has a connecting element with a coupling element for connecting the holder to a supporting structure, and three arms carried by the connecting element for rotation about parallel axes and for radial displacement relative to the axes. One end of the arms is aligned with threaded openings in a projector housing wall, and each arm carries a coupling device for connecting one arm end to a threaded opening in the housing wall. The connecting element releasably secures second end portions of the connected arms. The coupling device has a screw that extends through an opening in the arm, and two nuts mounted on a respective side of the arm. The nuts can be moved to position the arm at a chosen distance from the housing wall and to be tightened against the arm so as to secure the screw against rotation.

10 Claims, 1 Drawing Sheet

U.S. PATENT DOCUMENTS

2005/0139742 A1* 6/2005 Frisell .................. 248/317
2006/0186301 A1* 8/2006 Dozier et al. ............ 248/371
2007/0034765 A1* 2/2007 Lo ...................... 248/343

FOREIGN PATENT DOCUMENTS

SE         520352 C2 *  7/2003
WO    WO 02/10634 A1    2/2002

* cited by examiner

PROJECTOR HOLDER

This is a nationalization off PCT/SE2004/000340 filed 9 Mar. 2004 and published in English.

BACKGROUND OF THE INVENTION

1. Field of Invention

The present invention relates to a projector holder with a connecting element that includes a coupling element for connection of the projector holder to a supporting structure.

2. Description of the Prior Art

Typical video projectors include a number of threaded openings in at least one of the walls of the projector housing, for instance in the top or the bottom housing wall.

This enables the projector to be connected readily to an object, for instance a projector holder, by means of screws that engage with the threaded openings.

In turn, the projector holder includes a connecting element, for instance a ball coupling, which allows the holder, and also the projector stably connected to the holder, to be connected to a supporting structure.

The threaded openings in the wall of the projector housing are normally located at mutually different levels and at different distances apart in the many different commercially available projector models. The projector holder includes a number of straight elongate arms and a device by means of which the arms can be mutually joined and which includes a coupling device by means of which the projector holder can be connected to a supporting structure. This allows a first end of each arm to be placed over a respective threaded opening in the wall of the projector housing and connected to said wall with the aid of a connecting element.

The other end of respective arms is suitably slotted. The arms will typically include mutually parallel opposing surfaces and are placed so that their slotted or fork-shaped ends cross one another in an arm stack, wherein the connecting element includes a screw joint whose screw extends through the fork-shaped or slotted ends of the arms. The effective length and the direction of said arms from the connecting element can therewith be readily adjusted and the screw joint then tightened. The screw joint may, for instance, include a so-called finger-manipulated nut.

The connection between the first end of an arm and the corresponding threaded opening in the housing must be rigid and, for instance, be able to take-up both compression and tension forces. The connection must also be able to provide a desired effective length and also a non-rotatable connection of a forward threaded part to the threaded opening of the housing. In this regard, the forward threaded part must not protrude particularly far into the housing, so as to avoid the risk of damaging components in the housing. It will preferably be possible to establish the connection with the aid of standard elements, and preferably with the aid of simple screws, which although preferably having a standard length will nevertheless fit many different projector models that have threaded openings of corresponding diameter and thread systems. Because different projector models have threaded openings of mutually different diameters and/or thread systems, the first ends of said arms cannot include a thread for screw connections, for practical reasons.

SUMMARY OF THE INVENTION

Accordingly, an object of the present invention is to provide a projector holder of the aforesaid kind that has a simple and effective connection between the first end of respective arms and a threaded opening in the wall of the projector housing that is in alignment with said first end, wherewith the connection shall be readily adjustable with regard to the distance between said first end and said threaded opening.

A further object of the invention is to provide connections that are based on standard elements.

These objects are achieved by means of the invention.

The projector holder includes a connecting element having a coupling element for connection of the projector holder to a supporting structure, and at least three arms which are carried by the connecting element for rotation about mutually parallel axes and for radial displacement relative to the axes. A first end of the arms can be brought into alignment with threaded openings in a wall of a projector housing, and each arm carries a coupling device for connecting the first end of a respective arm to a nearby threaded opening in the wall of the housing. The connecting element is adapted to releasably secure the second end portions of the connected arms. The coupling device includes a screw that extends through an opening in the first end portion of a respective arm with a given degree of clearance, and two nuts which co-act with the thread on the screw and each of which is mounted on a respective side of the arm. The thread on the screw is able to co-act with thethred in the opening of the projector housing wall so as to enable the screw to be threaded to a desired depth in threaded openings in the housing wall. The nuts can be moved along the screw in a manner so as to locate the arm at a chosen distance from the housing wall and so as to be tightened against the arm, thereby securing the screw against rotation.

Further embodiments of the invention will be apparent from the accompanying detailed description.

Basically, the invention involves establishing each connection with the aid of a long screw which is inserted with play through an opening in the first end of an arm. The screw carries a nut on each side of the arm. The forward end of the screw is screwed through a short distance into the threaded wall opening of the projector housing. The nuts can then be rotated on the screw so as to establish a chosen distance between the opening of the projector housing and the nuts/said arm end, whereafter the nuts are tightened against the arm, therewith locking the screw against rotation in relation to both the arm opening and the wall opening of the projector housing. The screw may typically include a head that has a screw driving formation, for instance a screwdriver slot, so as to facilitate driving of the forward end of the screw into the threaded opening of the housing wall.

The holder connecting element can normally be displaced in a plane normal to the screws so that its fastener element (for instance ball coupling or a screw fastener) can be moved to a chosen position relative to the projector housing, whereafter the connecting element is tightened.

The connections can thus be established with the aid of standard elements and are able to bridge varying distances between the end of respective arms and the nearby threaded opening of the projector housing wall. It is also possible to control the depth to which the screw is screwed into the threaded opening. The screw can also be locked against rotation in relation to the projector housing and said end of a respective arm with the aid of said pair of nuts.

BRIEF DESCRIPTION OF THE DRAWINGS

The invention will now be described by way of example with reference to the accompanying drawing.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
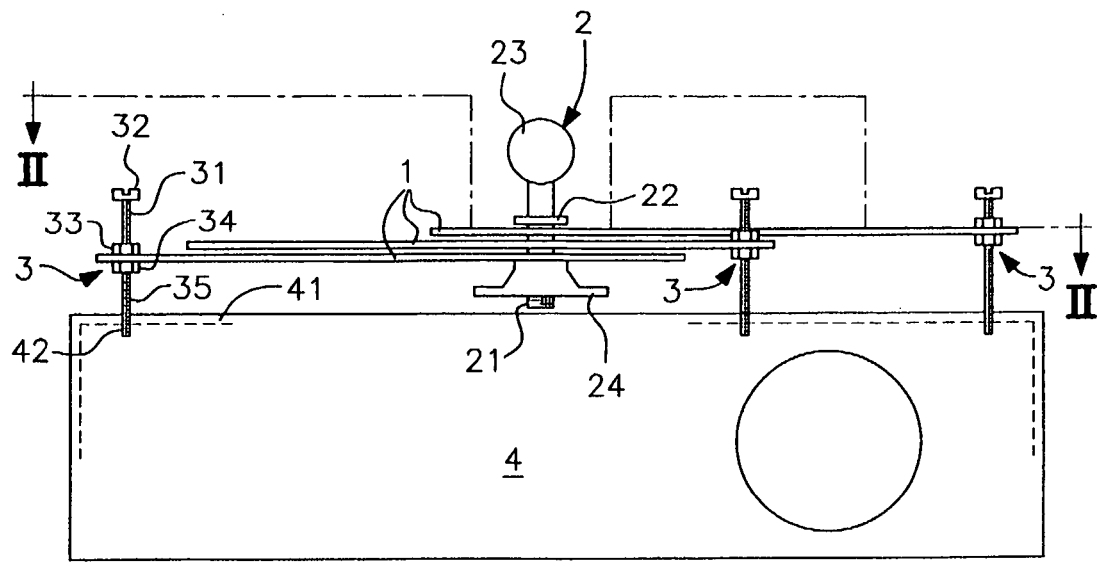
FIG. 1 is a schematic illustration of a projector holder mounted on a projector.

FIG. 1 illustrates a video projector 4 whose upper housing wall 41 includes a number of threaded openings 42.

The openings 42 have screwed therein the threaded forward end portion 35 of a screw 31 belonging to a projector holder that includes at least three arms 1 which can be connected mutually to a connecting element 2. Each arm has a first end 10 that includes a drilled hole 11 which receives the screw 31 with a given degree of clearance.

Figure 2:
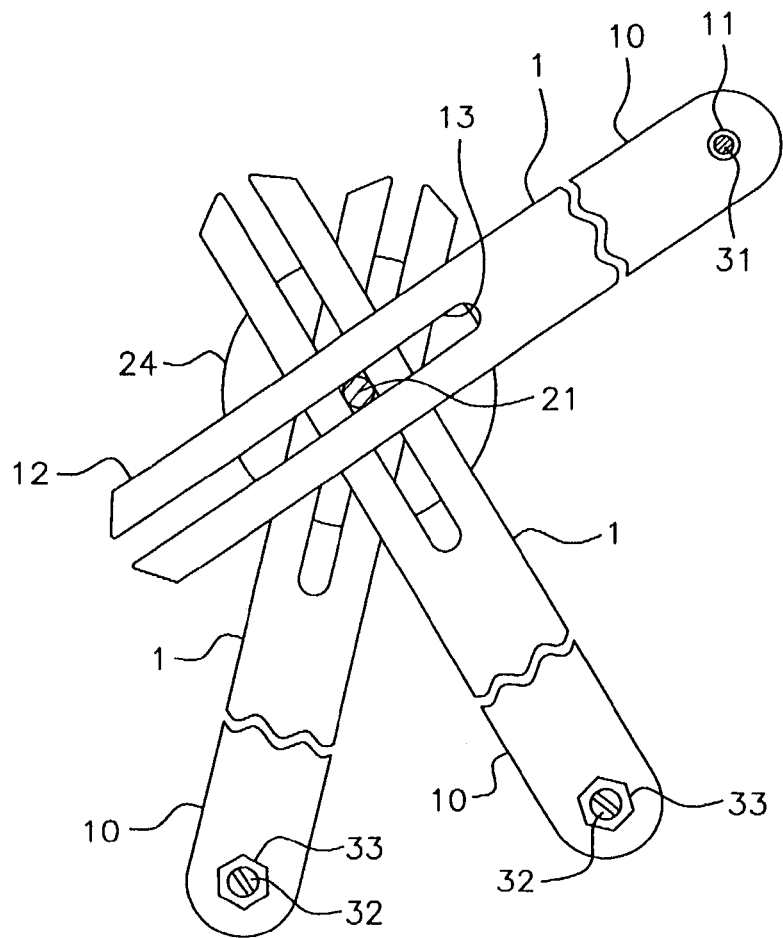
FIG. 2 illustrates schematically a sectioned view taken on the line II-II in FIG. 1.

The screw includes a nut 33, 34 on a respective side of the arm 1 forming a coupling device 3. The distance between said one end of a respective arm and the threaded opening 42 of the projector 4 can be fixedly adjusted, by screwing the nuts 33, 34 along the screw 31. The screw can be secured against rotation relative to the arm and to the threaded opening 42 of the projector housing, by tightening the nuts 33, 34 against said arm. A lock washer or locking plate may optionally be placed between the arm and a respective nut. The screw has a head 32 that includes a screw-driving formation, for instance a screwdriver slot. As will be seen from FIG. 2, the arms 1 include an elongate slot 13 at least at their other ends 12. The slots 13 receive a screw 21 included in the connecting element 2. The connecting element 2 includes a clamping plate 22 at one end of the screw 21. The clamping plate 22 carries a coupling element 23, which has the form of a ball coupling in the illustrated case. Alternatively, the coupling element 23 may have the form of a coupling screw or a fitting for mounting the projector holder to a supporting structure.

The connecting element 2 can be loosened and tightened respectively with the aid of a nut 24 in the form of a finger manipulated knob.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A projector holder comprising a connecting element having a coupling element for connection of the projector holder to a supporting structure, and at least three arms which are carried by the connecting element for rotation about mutually parallel axes and for radial displacement relative to said axes, so that a first end of the arms can be brought into alignment with threaded openings in a wall of a projector housing, each arm carrying a coupling device for connecting said first end of a respective arm to a nearby threaded opening in the wall of said housing, and the connecting element being adapted to releasably secure a second end of the connected arms, the coupling device including a screw which extends through an opening in the first end of a respective arm with a given degree of clearance, and two nuts which co-act with the thread on the screw and each of which is mounted on a respective side of said arm, the thread on the screw being able to co-act with the thread in the opening of the projector housing wall so as to enable the screw to be screwed to a desired depth in threaded openings in said housing wall the nuts being movable along the screw in a manner to locate the arm at a chosen distance from the housing wall and so as to be tightened against said arm and secure the screw against rotation, and the connecting element including a screw and a nut which co-acts with said screw of the connecting element, with the second ends of the respective arms including an elongate slot through which the screw of said connecting element extends, and the screw of said connecting element extending through the slots so as to enable a stack of the arms to be clamped stably to the connecting element.

2. The projector holder according to claim 1, wherein the slots in the respective arms are open towards said second end of the arms.

3. The projector holder according to claim 1, wherein the arms have generally a flat cross-sectional profile so as to support stably against each other in the connecting element.

4. The projector holder according to claim 1, wherein the arms are generally straight, so as to extend generally radially to the screw of the connecting element that carries the tightening nut of said element.

5. The projector holder according to claim 4, wherein the screw of the connecting element includes a shoulder that supports against an adjacent one of the arms.

6. The projector holder according to claim 1, wherein the arms have generally a flat cross-sectional profile so as to support stably against each other in the connecting element.

7. The projector holder according to claim 2, wherein the arms have generally a flat cross-sectional profile so as to support stably against each other in the connecting element.

8. The projector holder according to claim 1, wherein the arms are generally straight, so as to extend generally radially to the screw of the connecting element that carries the tightening nut of said element.

9. The projector holder according to claim 2, wherein the arms are generally straight, so as to extend generally radially to the screw of the connecting element that carries the tightening nut of said element.

10. The projector holder according to claim 3, wherein the arms are generally straight, so as to extend generally radially to the screw of the connecting element that carries the tightening nut of said element.

* * * * *